Jan. 19, 1954 W. A. RAY 2,666,451
VALVE STRUCTURE FOR CONTROLLING HIGH-PRESSURE FLUIDS
Filed Feb. 17, 1950 4 Sheets-Sheet 1

INVENTOR.
WILLIAM A. RAY
BY
John Flam
ATTORNEY

Jan. 19, 1954 W. A. RAY 2,666,451
VALVE STRUCTURE FOR CONTROLLING HIGH-PRESSURE FLUIDS
Filed Feb. 17, 1950 4 Sheets-Sheet 4

INVENTOR.
WILLIAM A. RAY
BY
John Flam
ATTORNEY

Patented Jan. 19, 1954

2,666,451

UNITED STATES PATENT OFFICE 2,666,451

VALVE STRUCTURE FOR CONTROLLING HIGH-PRESSURE FLUIDS

William A. Ray, North Hollywood, Calif., assignor to General Controls Co., a corporation of California Application February 17, 1950, Serial No. 144,681

19 Claims. (Cl. 137—656)

This invention relates to a valve structure intended to be electrically controlled.

Piston valves, operated by an electromagnet, are often used for the control of fluids at high pressures, often in the range of five hundred to several thousand pounds pressure per square inch. These valves have been designed to control a valve port having a large diameter. The force required to be overcome for opening the valve against these pressures is quite great; and, accordingly, a very powerful electromagnet is required. In addition, foreign matter may be lodged between the piston and the cylinder, further substantially increasing the resistance to opening.

It is one of the objects of this invention to make it possible to control such high pressure fluids (either gas or liquid) by the aid of relatively low power electromagnetic valves and, as a consequence of this result, to provide a valve that is relatively light in weight, and inexpensive to manufacture.

In order to accomplish these objects, the fluid pressure available on the inlet side of the valve is used to assist the electromagnet in its valve opening function, and particularly by moving the armature of the electromagnet toward attracted position by the fluid pressure.

The force of attraction of an electromagnet to move the movable part of the magnetic circuit is greatly increased for the same ampere turns when the air gap is reduced as the movable part moves toward attracted position. Accordingly, it is another object of this invention to provide an electromagnetically operated valve in which the magnetic reluctance of the electromagnet is greatly reduced before the electromagnet is required to attract its armature.

Particularly, it is another object of this invention to utilize the pressure of the fluid being controlled to effect this result.

It is still another object of this invention to control the fluid pressure that moves the movable part of the magnetic circuit by the aid of a pilot electromagnetic valve.

Thus, in order to open the valve, the pilot valve operates at once to cause movement of the armature; and, when the armature is moved sufficiently, the main electromagnet serves to complete the movement of the armature to attracted position.

The valve structure may be so designed that, during initial movement of the armature, under the influence of the fluid pressure and of the main electromagnet, energy is stored, as in a spring; and, when the armature movement is completed, the energy is released by reducing the fluid pressure operating to urge the closure against its seat.

It is, accordingly, another object of this invention to provide a valve structure in which the valve closure is operated by the release of energy stored by fluid pressure and by operation of an electromagnet.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings.

In the present instance, the valve structure is designed to control liquids at high pressures, such as of the order of one thousand pounds per square inch. The pressure of the liquid is utilized for assisting in the valve operation.

Figure 1:
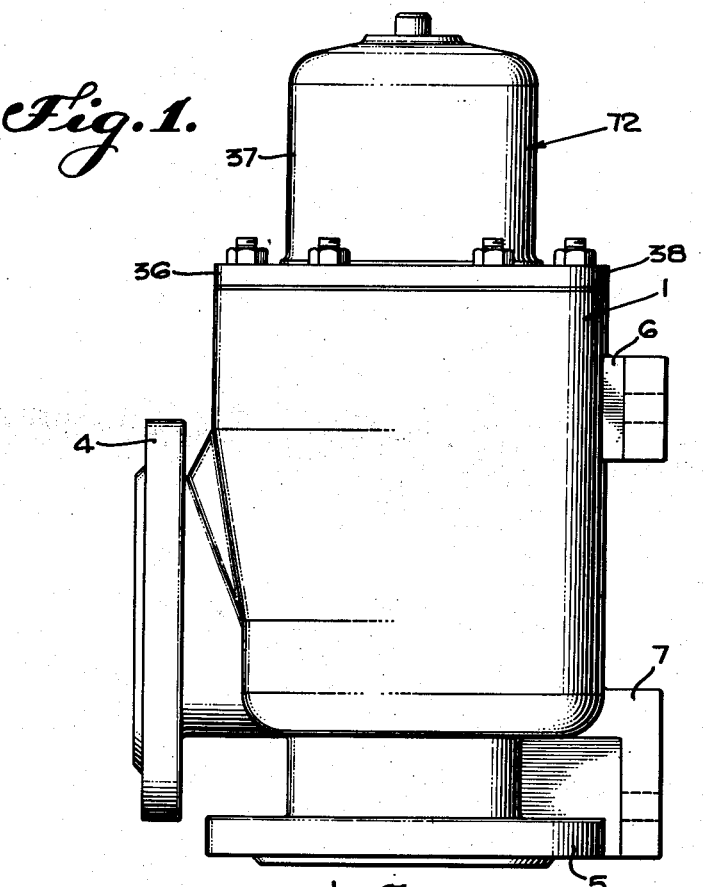
Figure 1 is an elevation of a valve structure incorporating the invention.
Figure 2:
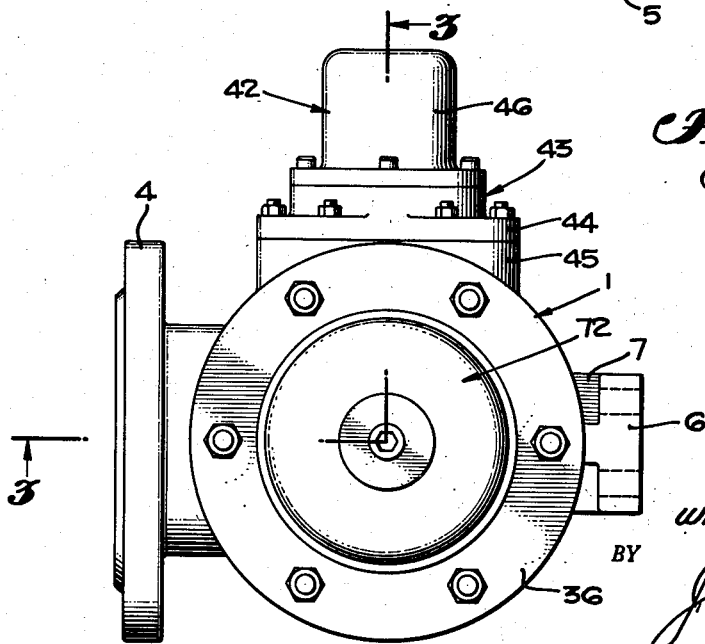
Fig. 2 is a plan view thereof.
Figure 3:
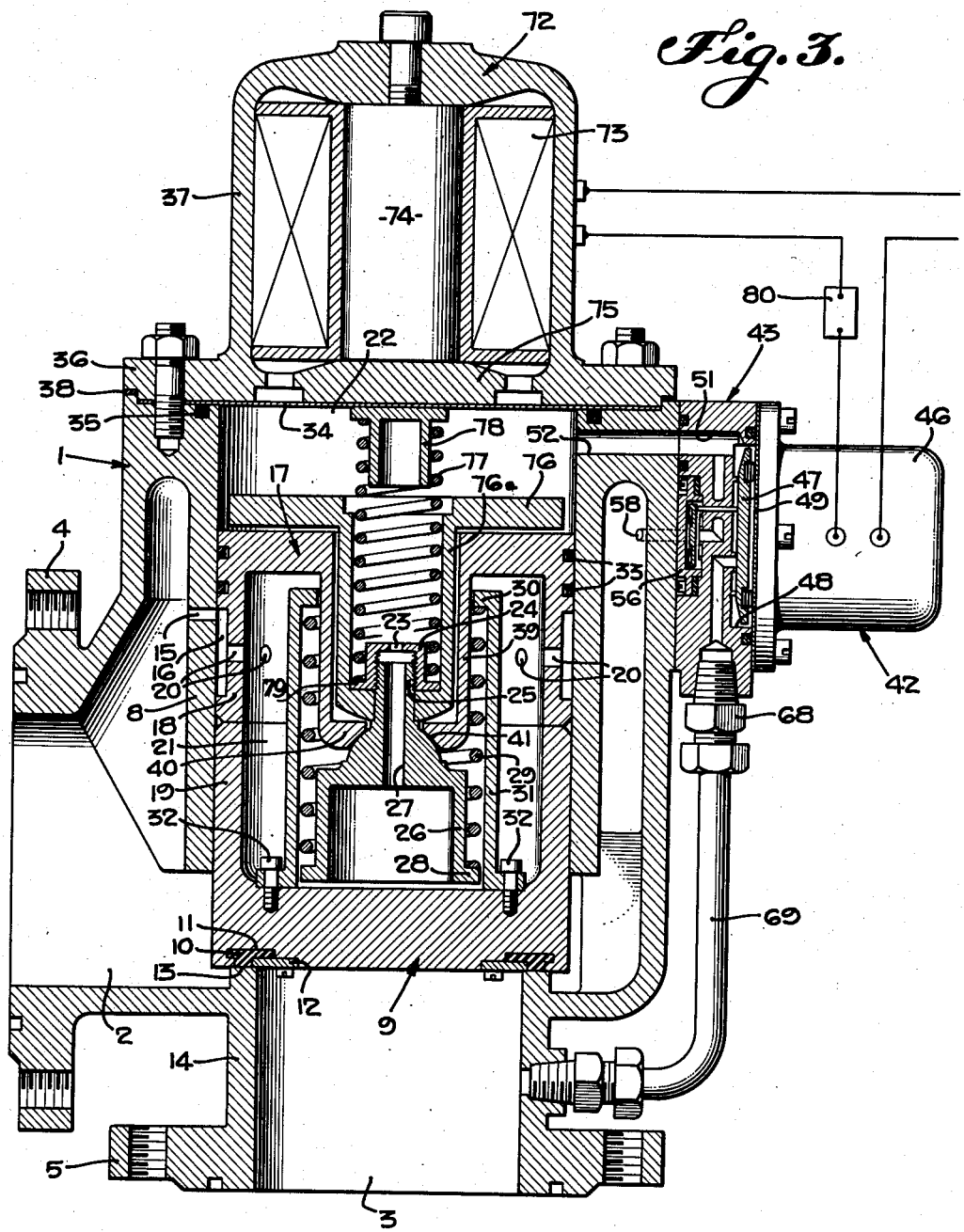
Fig. 3 is a sectional view of the valve structure, taken along a plane corresponding to line 3—3 of Fig. 2 and showing the valve mechanism in the closed position.
Figure 4:
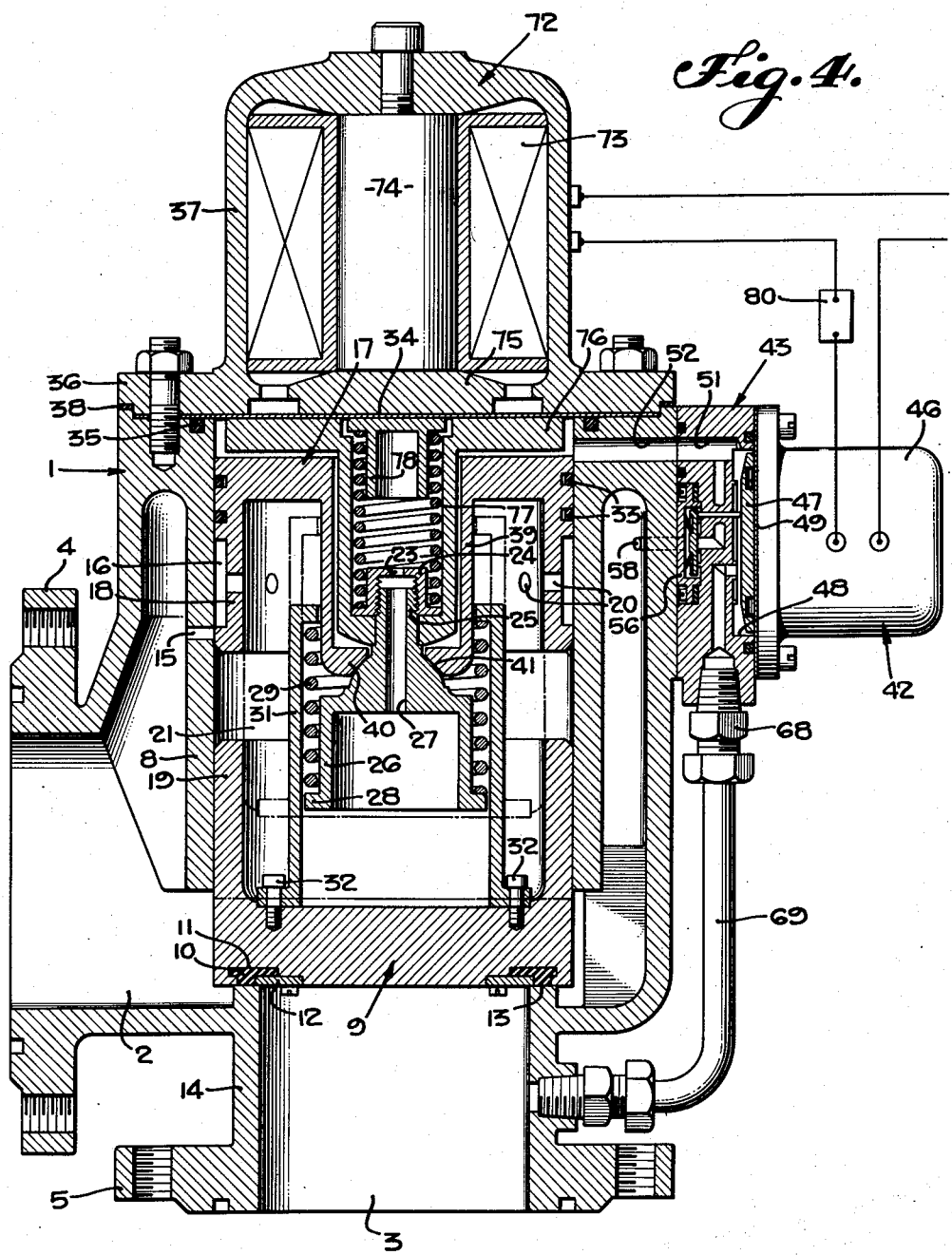
Fig. 4 is a view similar to Fig. 3, but illustrating the valve structure about to move to open position.

The valve structure includes a valve body 1 that has an inlet passageway 2 and an outlet passageway 3 (Figs. 3 and 4). The valve body is intended to be attached to an inlet conduit by the aid of a flange structure 4, and the outlet passageway is intended to be placed in communication with an outlet conduit by the aid of the flange structure 5. The body 1 is preferably made of a casting, and may be provided with attaching feet or lugs 6 and 7 (Figs. 1 and 2) for attaching the body to an appropriate support.

The body 1, as shown most clearly in Figs. 3 and 4, has an integral cylinder wall 8, the exterior of which is exposed to the inlet passageway 2. Within this cylinder 8 a piston 9 is movable in a vertical direction, corresponding with the axis of the outlet passageway 3. This piston 9 has a relatively long skirt 19. At its lower end it carries the valve closure structure including a resilient ring 10, as of rubber, held in an annular groove 11 in the head of the piston 9. This groove is undercut to accommodate the outer edge of the closure member 10, purposely of reduced thickness. This ring 10 is held in place by a clamp ring 12 attached to the piston.

The closure member 10 cooperates with the upper annular edge 13 of the wall 14 that forms the outlet passage 3.

In the closed position of Fig. 3, fluid under pressure is permitted to enter above the head of the piston 9. This is accomplished by the aid of a port 15 which communicates with an annular passage or groove 16 of a second piston 17 in the closed position of Fig. 3. This second piston 17 has a skirt 18, the lower edge of which is in contact with the skirt 19 of the piston 9. The groove 16 is in communication with the space 21 formed between the two pistons 9 and 17 by a number of radial ports 20 which extend through the skirt 18.

In the closed position of Fig. 3, fluid pressure is also effective in space 22 above the piston 17, so that both of the pistons 9 and 17 are urged downwardly to the closing position. The communication from the space 21 to the space 22 is effected through a restricted port 23. This port is formed in an internally threaded cap 24 that is threaded on a stem 25. This stem is integral with an inverted cup member 26 extending downwardly within the skirt 19 of piston 9. A port 27 is formed through this stem 25. The passage of fluid from space 21 to space 22 occurs through the bottom of cup 26 and ports 27 and 23.

The lower edge of the cup 26 is provided with a flange 28 to form a rest for a heavy compression spring 29. The upper end of the compression spring 29 is urged against an inwardly directed flange 30 formed on a tubular member 31. This tubular member 31 is attached, as by screws 32, to the upper surface of the head of piston 9.

The spring 29 is in its fully expanded position when the valve is closed, as in Fig. 3. Accordingly, it exerts only a small force to keep the two piston skirts 18 and 19 in contact. The pressure of the liquid available through the restricted port 23 to space 22 is effective to urge both of the pistons 9 and 17 downwardly against the pressure in space 21.

The piston 17 is provided with piston rings 33 in order to provide a seal for the space 22. The upper end of the cylindrical space 22 is closed by a sealing diaphragm 34 that cooperates with the rubber O-ring 35 to seal the cylindrical space. A flange 36 of an electromagnet casing or shell 37 is used for clamping the diaphragm 34 in place. A supplemental packing ring 38 may be interposed between the flange 36 and the top of the body 1.

The piston 17 is provided with a hollow inwardly directed sleeve 39. The lower end of this sleeve is provided with an inwardly directed flange 40 in contact with a spherical surface 41 on the upper surface cup 26. For a purpose to be hereinafter described, this spherical surface permits universal movement between the piston 17 and the cup 26.

Figure 5:
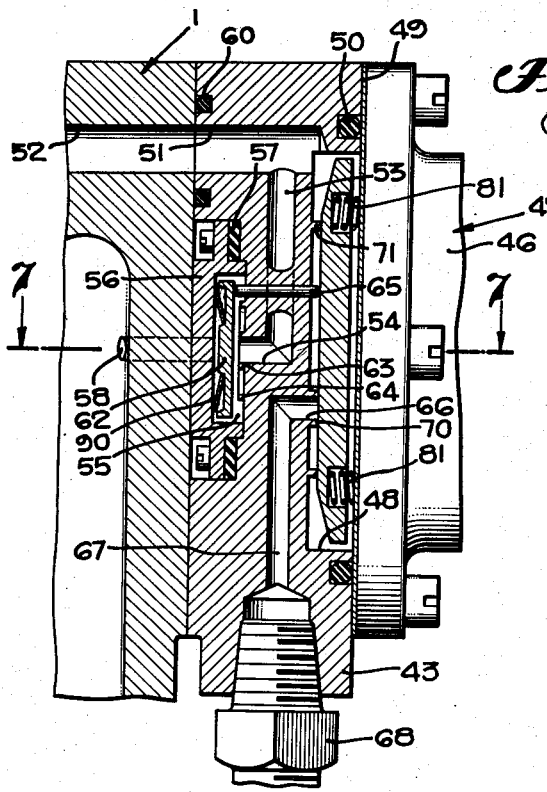
Fig. 5 is an enlarged fragmentary sectional view illustrating a control valve for the main valve structure, the valve being in a position corresponding to that shown in Fig. 3.
Figure 6:
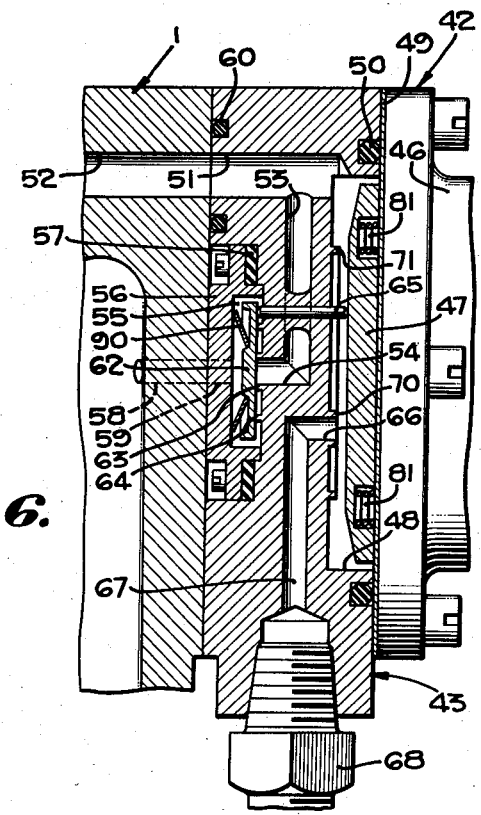
Fig. 6 is a view, similar to Fig. 5, illustrating the position of the control valve corresponding to Fig. 4.
Figure 7:
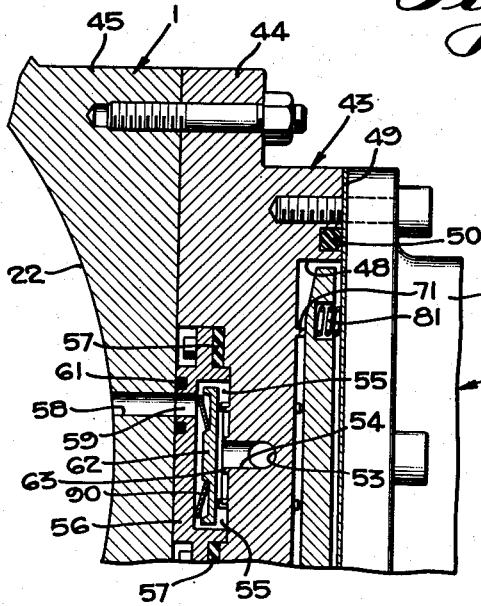
Fig. 7 is a fragmentary sectional view, taken along a plane corresponding to line 7—7 of Fig. 5.

In order to raise the piston 9 that carries the closure structure, the pressure in the spaces 21 and 22 must be relieved, and a force applied to urge the piston 9 upwardly. In order to accomplish these functions, use is made of electromagnetically operated structures mounted upon the body 1. Thus, a pilot or control valve structure 42 (Figs. 2, 3, and 4) is mounted on a right-hand side of the body 1, and includes a valve plate 43. This valve plate 43 is mounted, as shown in Fig. 2, by the aid of a flange 44 upon a boss 45 formed integrally with the body 1. The shell 46 of the electromagnetic structure 42 houses a coil which may be energized to attract an armature 47. This armature 47 may be in the form of a disc which is movable in a recess 48 of the plate 43. Closing this recess is a diaphragm 49 (Figs. 5, 6, and 7). A rubber O-ring 50 serves to seal the recess 48. The shell 46 may serve as a part of the magnetic circuit for the electromagnetic structure 42. This electromagnet is of similar structure to the electromagnet 72 mounted in the shell 37, and has a central core for attracting armature 47. Any suitable spring structure can be used to urge armature 47 away from the diaphragm 49 when the electromagnet is de-energized.

The plate 43 has a port 51 that communicates with the port 52 in the body 1, and that is in communication with the space 22. This port 51 also communicates directly with the recess 48. It is also in communication with a vertical port 53 that has a horizontal extension 54. This horizontal extension 54 leads into a space 55 formed by the aid of a cover member 56 mounted in a recess in the plate 43. The flange of this plate 56 forms a means of attachment, and a gasket 57 is interposed between the cover member 56 and the plate 43. The space 55 is in communication with the inlet 2 by the aid of the ports 58 and 59 (Fig. 7) extending through the member 56 and the wall of the body 1. In the closed position of Fig. 3, the space 22 is further in communication with the inlet 2 by way of the ports 58 and 59, space 55, and ports 54, 53, 51, and 52. In order to provide a sealed structure, an O-ring 60 extends around the port 51, and a rubber O-ring 61 surrounds the port 59 (Fig. 7).

When the electromagnet 46 is deenergized, there is communication from the inlet 2 to the space 22. However, when the armature 47 is attracted to the position of Figs. 4 and 6, port 54 is closed by a disc closure member 62 located in recess 55. This closure member then is urged by fluid pressure against the edge 63 surrounding the port 54, and against an annular boss 64 spaced therefrom. In order to move the armature 47 to the left when the electromagnet is de-energized, and against the fluid pressure, a plurality of compression springs 61 is interposed between the armature and the diaphragm 49.

When the electromagnet is de-energized, the left-hand side of the armature 47 coacts with a plurality of pins 65, slidably mounted in the plate 43, to hold the disc 62 in the open position. When the electromagnet 42 is energized, these pins can move toward the right, and the disc 62 can move, under the influence of a light spring 90, to the closed position, and it is held in that position by inlet pressure acting upon the disc 62.

At the same time, pressure in space 22 is relieved by passage of the medium through the port 51 and recess 48 through ports 66 and 67 in plate 43. Port 67 connects with a coupling 68 and a conduit 69 to the outlet passageway 3. The port 66 is provided with an annular seat 70 which is closed by the armature 47 in the unattracted position of Fig. 5. An annular boss 71 is also provided on the plate 43 for the armature 47.

Accordingly, as soon as electromagnet 42 is energized, the pressure above the piston 17 is relieved by aid of the opening of the port 66. When this occurs, the piston 17 is urged upwardly by the preponderating pressure in the space between the pistons 9 and 17. This upward movement of the piston 17 begins to compress the strong spring 29, since the inlet pressure is still effective, through port 20, to urge the piston 9 to seated position.

Since communication to space 22 from inlet 2 is now effective only through restricted port 23, the pressure in space 22 remains greatly below inlet pressure as the piston 17 moves upwardly. When the piston 17 reaches the position of Fig. 4, in which the port 15 is out of communication with the annular groove 16, inlet pressure is no longer effective to maintain the piston 9 in closed position. The space between the pistons is now slowly vented through the restricted port 23, space 22, ports 52, 51, recess 48, and port 66. Accordingly, the energy stored in the spring 29 is released due to this relief in pressure, and the piston is urged upwardly to open position (indicated in dot-and-dash lines in Fig. 4) by expansion of this spring against flange 30.

In order to hold the piston 9 in open position, as well as to assist the force of the spring 29, the electromagnet structure 72 is provided. The operating coil 73 (Figs. 3 and 4) is housed in the magnetic shell 37. The magnetic circuit includes a central core 74, a pole piece 75 which rests upon the diaphragm 34, and the shell 37. The moving part of the electromagnetic circuit includes a disc armature 76 in the space 22. This armature has a downwardly extending sleeve 76a that is held to the stem 25 of the cup 26 by the aid of the cap 24. A relatively weak compression spring 77 is guided at its upper end by the guide member 78 attached to the diaphragm 34 below pole piece 75. The lower end of the compression spring rests against the flange 79 of the cap 24. Accordingly, the armature 76 is normally urged by the spring 77 to the position of Fig. 3 away from the diaphragm 34. The stem 25 of the cup 26 is likewise urged downwardly by this spring.

As soon as the piston 17 approaches the electromagnetic polar area formed by the lower end of the shell 37 and the pole piece 75, the electromagnet 72 attracts the armature 76 and holds it in the position of Fig. 4. In this position, the spring 29 is about to be released to urge the sleeve 31 upwardly and to open the valve.

Since the port 23, establishing communication between the spaces 21 and 22, is quite restricted, the pressure above the piston 17 is quickly reduced when the electromagnet 42 is energized and a pressure substantially that of the inlet is effective in the space 21 to maintain the piston 9 in closed position. However, as soon as port 15 is covered by the skirt 18 (Fig. 4), the pressure in the space 21 is reduced to permit expansion of the spring 29, releasing its energy and lifting the piston 9. At the same time, the armature 76 has been moved upwardly to a place where it may be attracted by the electromagnetic structure 72. This armature 76 is permitted to align itself with the polar areas by virtue of the universal connection provided by the spherical surface 41.

Preferably, the electromagnet structures 42 and 72 may be energized simultaneously from a common source. This common source may be either alternating current or direct current. This is diagrammatically illustrated in Figs. 3 and 4, showing the two electromagnets 42 and 72 in series and controlled by a control switch 80.

While the electromagnetic structures 42 and 72 are energized, the valve is held in the open position. The inlet pressure acts upon the lower end of the piston 9 to hold it in this position.

Upon opening of the control switch 80, both electromagnets are simultaneously deenergized. The spring 77 serves to separate the armature 76 from the polar areas of the electromagnet. The relief port 66 is closed due to the operation of the armature 47 of the electromagnet 42. At the same time, the port 54 opens. Accordingly, pressure can now be exerted through the medium passing through the restricted port 23, as well as through the port 54, to produce a force in space 22 urging the piston 17 downwardly. The piston 17 accordingly moves downwardly under the influence of the fluid pressure. This is a relatively slow movement, since the pressure in space 22 builds up slowly. As soon as the annular groove 16 is placed in communication with the port 15, inlet fluid pressure is also exerted in the space 21 and the piston 19 is seated by this pressure. Ultimately, the parts assume the closed position illustated in Fig. 3.

The opening movement of the piston 17 is assisted by the force exerted by electromagnet 72 on armature 76. This force increases very greatly the shorter the air gap between the armature 76 and the polar areas. This attracting force becomes great enough to pull the armature 76 into the open position of Fig. 4 after a substantial travel of the piston 17. Accordingly, electromagnet 72 need not be made excessively large or powerful. Its force is used only to complete the opening movement of the pistons.

The inventor claims:

1. In a valve structure to control a fluid medium: a valve body having an inlet passage and an outlet passage; a movable valve closure structure to open and close communication between the passages; means utilizing the fluid pressure of the medium for urging the closure structure to closed position; a movable wall; a connection between the movable wall and the closure structure; said connection transmitting a force to move the valve closure to open position when the movable wall moves in one direction; means for exerting fluid pressure of the medium upon both sides of the wall; means for producing an unbalanced pressure on opposite sides of the wall for urging the wall in valve-opening direction; and electromagnetic means for supplementing said unbalanced pressure for moving the wall; and means controlled by movement of the wall toward opening position to reduce the pressure that urges the closure structure to closed position.

2. In a valve structure to control a fluid medium: a valve body having an inlet passage and an outlet passage; a movable valve closure structure to open and close communication between the passages; a first movable wall carrying the closure structure; a second movable wall; a resilient connection between the walls; said body and the second wall having cooperating ports for admitting the medium to act on one side of the first wall to urge the first wall toward valve closing position and to urge the second wall in a valve opening direction; means forming a port passing the medium through a restricted opening to the other side of said second wall; movement of said second wall causing said cooperating ports to interrupt the flow of the medium to said walls; and means for relieving the pressure on the said other side of the second wall to initiate movement of the second wall.

3. In a valve structure to control a fluid medium: a valve body having an inlet passage and an outlet passage; a movable valve closure structure to open and close communication between the passages; a first movable wall carrying the closure structure; a second movable wall; a resilient connection between the walls; said body and the second wall having cooperating ports for admitting the medium to act on one side of the first wall to urge the first wall toward valve closing position and to urge the second wall in a valve opening direction; means forming a port passing the medium through a restricted opening to the other side of said second wall; movement of said second wall causing said cooperating ports to interrupt the flow of the medium to said walls; means for relieving the pressure on the said other side of the second wall to initiate movement of the second wall; and supplemental means acting concurrently with the pressure relieving means, for moving the said second wall in a valve opening direction.

4. In a valve structure to control a fluid medium: a valve body having an inlet passage and an outlet passage; a movable valve closure structure to open and close communication between the passages; a first movable wall carrying the closure structure; a second movable wall; a spring connecting the walls and storing energy when the second wall moves in a valve opening direction; said body and the second wall having cooperating ports for admitting the medium to act on one side of the first wall to urge the first wall toward valve closing position and to urge the second wall in a valve opening direction; means forming a port passing the medium through a restricted opening to the other side of said second wall; movement of said second wall causing said cooperating ports to interrupt the flow of the medium to said walls; and means for relieving the pressure on the said other side of the second wall to initiate movement of the second wall.

5. In a valve structure to control a fluid medium: a valve body having an inlet passage and an outlet passage; a valve closure structure for interrupting passage of the medium from the inlet passage to the outlet passage; a first piston; a second piston; said first piston carrying the closure structure; said pistons cooperating to form a pressure space; a resilient connection between the pistons; said body and the second piston having cooperating ports to pass said medium into said space to urge the first piston to valve closing position and to exert a force on one side of the second piston, there being restricted communication from said space to the other side of said second piston to cause the medium to exert a force urging the second piston toward closing position; means for relieving the pressure on said other side to begin movement of the second piston toward valve opening direction; said ports being out of registry upon movement of the second piston to a definite position for preventing further passage of the medium into said space; and means acting concurrently with the pressure relieving means for exerting a force upon the second piston in a valve opening direction.

6. In a valve structure to control a fluid medium: a valve body having an inlet passage and an outlet passage; a valve closure structure for interrupting passage of the medium from the inlet passage to the outlet passage; a first piston; a second piston; said first piston carrying the closure structure; said pistons cooperating to form a pressure space; a resilient connection between the pistons; said body and the second piston having cooperating ports to pass said medium into said space to urge the first piston to valve closing position and to exert a force on one side of the second piston, there being restricted communication from said space to the other side of said second piston to cause the medium to exert a force urging the second piston toward closing position; means for relieving the pressure on said other side to begin movement of the second piston toward valve opening direction; said ports being out of registry upon movement of the second piston to a definite position for preventing further passage of the medium into said space; and electromagnetic means for acting concurrently with the pressure relieving means for assisting movement of the second piston in a valve opening direction.

7. In a valve structure to control a fluid medium: a body having an inlet passage and an outlet passage; a movable closure structure operating to interrupt the flow of the medium to the outlet passage; said body forming a cylinder; a piston structure including a first piston and a second piston in said cylinder, and forming a space between the pistons; the first piston carrying the closure structure; a spring connecting the pistons, said spring being compressed upon movement of the second piston away from the first piston; said second piston and the cylinder having cooperating port means for passing fluid into said space and for interrupting the flow of fluid when the second piston moves to a point away from the valve closing position; means forming a restricted opening between the space and the cylinder space beyond the second piston; and valve means for alternately preventing flow of fluid from said cylinder space and for relieving the pressure in said cylinder space; said valve means when relieving pressure serving to cause fluid pressure to move said second piston and store energy in the spring until said port means closes.

8. In a valve structure to control a fluid medium: a body having an inlet passage and an outlet passage; a movable closure structure operating to interrupt the flow of the medium to the outlet passage; said body forming a cylinder; a piston structure including a first piston and a second piston in said cylinder, and forming a space between the pistons; the first piston carrying the closure structure; a spring connecting the pistons, said spring being compressed upon movement of the second piston away from the first piston; said second piston and the cylinder having cooperating port means for passing fluid into said space and for interrupting the flow of fluid when the second piston moves to a point away from the valve closing position; means forming a restricted opening between the space and the cylinder space beyond the second piston; valve means for alternately preventing flow of fluid from said cylinder space and for relieving the pressure in said cylinder space; said valve means when relieving pressure serving to cause fluid pressure to move said second piston and store energy in the spring until said port means closes; and electromagnetic means having an armature joined to the second piston for exerting an opening force on said second piston.

9. In a valve structure to control a fluid medium: a body having an inlet passage and an outlet passage; a movable closure structure operating to interrupt the flow of the medium to the outlet passage; said body forming a cylinder; a piston structure including a first piston and a second piston in said cylinder, and forming a space between the pistons; the first piston carrying the closure structure; a spring connecting the pistons, said spring being compressed upon movement of the second piston away from the first piston; said second piston and the cylinder having cooperating port means for passing fluid into said space and for interrupting the flow of fluid when the second piston moves to a point away from the valve closing position; means forming a restricted opening between the space and the cylinder space beyond the second piston; valve means for alternately preventing flow of fluid from said cylinder space and for relieving the pressure in said cylinder space; said valve means when relieving pressure serving to cause fluid pressure to move said second piston and store energy in the spring until said port means closes; an electromagnet having an armature; and a universal connection between the armature and the second piston for transmitting the force of said electromagnet to move the second piston in valve opening direction.

10. In a valve structure to control a fluid medium: a body having an inlet passage and an outlet passage; a movable closure structure operating to interrupt the flow of the medium to the outlet passage; said body forming a cylinder; a piston structure including a first piston and a second piston in said cylinder, and forming a space between the pistons; the first piston carrying the closure structure; a spring connecting the pistons, said spring being compressed upon movement of the second piston away from the first piston; said second piston and the cylinder having cooperating port means for passing fluid into said space and for interrupting the flow of fluid when the second piston moves to a point away from the valve closing position; means forming a restricted opening between the space and the cylinder space beyond the second piston; electromagnetic valve means for alternately preventing flow of fluid from said cylinder space and for relieving the pressure in said cylinder space to permit the second piston to move in valve opening direction; and electromagnetic means having a part of its magnetic circuit joined to the second piston for exerting an opening force on the second piston.

11. In a valve structure to control a fluid medium: a body having an inlet passage and an outlet passage; a movable closure structure operating to interrupt the flow of the medium to the outlet passage; said body forming a cylinder; a piston structure including a first piston and a second piston in said cylinder, and forming a space between the pistons; the first piston carrying the closure structure; a spring connecting the pistons, said spring being compressed upon movement of the second piston away from the first piston; said second piston and the cylinder having cooperating port means for passing fluid into said space and for interrupting the flow of fluid when the second piston moves to a point away from the valve closing position; means forming a restricted opening between the space and the cylinder space beyond the second piston; electromagnetic valve means for alternately preventing flow of fluid from said cylinder space and for relieving the pressure in said cylinder space to permit the second piston to move in valve opening direction; electromagnetic means having a part of its magnetic circuit joined to the second piston for exerting an opening force on the second piston; and a common means for energizing both electromagnetic means.

12. In a valve structure to control a fluid medium: a body having an inlet passage and an outlet passage; a movable closure structure for interrupting the flow of the medium to the outlet passage; means utilizing the inlet pressure of the medium for urging the closure structure to closed position; an electromagnet having a movable armature; a resilient connection between the armature and the closure structure; said resilient connection having provisions for exerting a force to urge the closure to open position upon movement of the armature toward attracted position; and means operated by the fluid pressure of the medium for initiating movement of the armature toward attracted position.

13. In a valve structure to control a fluid medium: a body having an inlet passage and an outlet passage; a movable closure structure for interrupting the flow of the medium to the outlet passage; means utilizing the inlet pressure of the medium for urging the closure structure to closed position; a movable operator; a resilient connection between the operator and the valve closure structure, urging the closure structure and the operator toward each other; means utilizing the fluid pressure of the medium for initiating movement of the operator in a direction away from said closure; said resilient connection imposing on the closure structure a valve opening force as the operator is moved in said direction; an electromagnet; and an armature for the electromagnet connected to the operator.

14. In a valve structure to control a fluid medium: a valve body having an inlet passage and an outlet passage; a movable valve closure structure cooperating with the outlet passage to open and close communication between the passages; a movable wall; an energy storing connection between the movable wall and the closure structure; means for establishing communication from the inlet passage to a surface of the valve closure structure to exert a pressure on said closure structure for opposing movement of said valve closure structure toward valve opening position; means for moving the movable wall in one direction; movement of said movable wall in said one direction storing energy in said energy storing connection while said valve closure is prevented from opening movement by said pressure applied to said valve closure structure; means for interrupting said communication from said inlet passage to the valve closure structure upon a predetermined movement in said one direction of said movable wall; and means for relieving the pressure on said closure structure when said communication is interrupted.

15. In a valve structure to control a fluid medium: a valve body having an inlet passage and an outlet passage; a movable valve closure structure cooperating with the outlet passage to open and close communication between the passages; a movable wall; an energy storing connection between the movable wall and the closure structure; means for establishing communication from the inlet passage to a surface of the valve closure structure to exert a pressure on said closure structure for opposing movement of said valve closure structure toward valve opening position; means selectively operable and utilizing the fluid pressure of the medium optionally for moving the movable wall between two positions respectively; movement of said movable wall toward one position storing energy in said energy storing connection while said valve closure is prevented from opening movement by said pressure applied to said valve closure structure; means for interrupting said communication from said inlet passage to the valve closure structure upon movement of said movable wall a predetermined amount toward said one position; and means for relieving the pressure on said closure structure when said communication is interrupted.

16. In a valve structure to control a fluid medium: a valve body having an inlet passage and an outlet passage; a movable valve closure structure cooperating with the outlet passage to open and close communication between the passages; a movable wall; an energy storing connection between the movable wall and the closure structure; means for establishing communication from the inlet passage to a surface of the valve closure structure to exert a pressure on said closure structure for opposing movement of said valve closure structure toward valve opening position; means for moving the movable wall in one direction; movement of said movable wall in said one direction storing energy in said energy storing connection while said valve closure is prevented from opening movement by said pressure applied to said valve closure structure; electromagnetic means for supplementing the force of said wall moving means; means for interrupting said communication from said inlet passage to the valve closure structure upon a predetermined movement in said one direction of said movable wall; and means for relieving the pressure on said closure structure when said communication is interrupted.

17. In a valve structure to control a fluid medium: a body having an inlet passage and an outlet passage; a movable closure structure operating to interrupt the flow of the medium to the outlet passage; means forming a piston chamber; first and second pistons in said chamber and forming a space between them; the first piston carrying the closure structure; a spring capable of storing energy and connected between the pistons; said second piston having a passage opening in said space; means forming an opening in said chamber and communicating with the inlet and said second piston passage to exert a pressure on said first piston for opposing movement of said first piston toward valve opening position; there being a constricted passage between said space and that portion of the chamber beyond the second piston; valve means for alternately preventing flow of fluid from said chamber portion and for relieving pressure in said chamber portion; said pressure relief serving to cause fluid pressure in said space to move said second piston in a direction away from said first piston; movement of said second piston in said direction storing energy in the spring while said first piston is prevented from opening movement by said pressure exerting means; and means for interrupting said communication between said port and said second piston passage upon movement of the second piston a predetermined amount in said direction to permit reduction of said pressure on said first piston to open the valve.

18. In a valve structure to control a fluid medium: a body having an inlet passage and an outlet passage; a movable closure structure operating to interrupt the flow of the medium to the outlet passage; means forming a piston chamber; first and second pistons in said chamber and forming a space between them; the first piston carrying the closure structure; a spring capable of storing energy and connected between the pistons; said second piston having a passage opening in said space; means forming an opening in said chamber and communicating with the inlet and said second piston passage to exert a pressure on said first piston for opposing movement of said first piston toward valve opening position; there being a constricted passage between said space and that portion of the chamber beyond the second piston; valve means for alternately preventing flow of fluid from said chamber portion and for relieving pressure in said chamber portion; said pressure relief serving to cause fluid pressure in said space to move said second piston in a direction away from said first piston; movement of said second piston in said direction storing energy in the spring while said first piston is prevented from opening movement by said pressure exerting means; means for interrupting said communication between said port and said second piston passage upon movement of the second piston a predetermined amount in said direction to permit reduction of said pressure on said first piston to open the valve; and electromagnetic means for supplementing the fluid pressure to move the second piston and to hold the second piston in valve opening position.

19. In a valve structure to control a fluid medium: a body having an inlet passage and an outlet passage; a movable closure structure operating to interrupt the flow of the medium to the outlet passage; means forming a piston chamber; first and second pistons in said chamber and forming a space between them; the first piston carrying the closure structure; means for admitting fluid under pressure in said space to maintain said first piston in valve closing position, said fluid admitting means being operable only until said second piston reaches a predetermined position away from said first piston; means for relieving the fluid pressure in said space after said first piston reaches said predetermined position; a spring between said first and second pistons, and resiliently strained upon relative movement between said pistons to impose an increasing valve opening force upon said first piston as said second piston moves away from said first piston; means utilizing fluid pressure for moving said second piston away from said first piston; an electromagnet having a polar area; an armature carried by said second piston; said armature being moved toward said polar area to be increasingly under the influence of said electromagnet as said second piston approaches said limiting position.

WILLIAM A. RAY.

References Cited in the file of this patent

UNITED STATES PATENTS

| Number | Name | Date |
| --- | --- | --- |
| 1,807,191 | Boyle | May 26, 1931 |
| 2,439,523 | Miller | Apr. 13, 1948 |
| 2,490,559 | Taccone | Dec. 6, 1949 |
| 2,575,272 | Harris | Nov. 13, 1951 |